United States Patent [19]
Saida

[11] Patent Number: 5,520,579
[45] Date of Patent: May 28, 1996

[54] VENTILATION LOUVER ASSEMBLY, AND METHODS OF CONSTRUCTING AND UTILIZING SAME

[75] Inventor: Yoshitaka Saida, Utsunomiay, Japan

[73] Assignee: Honda Giken Kogyo Kabushiki Kaisha, Tokyo, Japan

[21] Appl. No.: 292,201

[22] Filed: Aug. 19, 1994

[51] Int. Cl.$^6$ ..................................................... B60H 1/34
[52] U.S. Cl. .......................... 454/155; 454/315; 454/320
[58] Field of Search ................................... 454/155, 313, 454/315, 320

[56] References Cited

U.S. PATENT DOCUMENTS

| | | |
|---|---|---|
| 3,648,590 | 3/1972 | Mercier ................................. 454/155 |
| 3,777,650 | 12/1973 | Wenig . |
| 3,898,921 | 8/1975 | Trube et al. . |
| 3,908,528 | 9/1975 | Bertin et al. . |
| 3,921,507 | 11/1975 | Condet et al. . |
| 3,952,639 | 4/1976 | Nobata . |
| 4,142,456 | 3/1979 | Locker . |
| 4,633,770 | 1/1987 | Taylor et al. . |
| 4,653,384 | 3/1987 | Amano . |
| 4,665,806 | 5/1987 | Martin, Sr. . |
| 4,729,292 | 3/1988 | Marton . |
| 4,852,470 | 8/1989 | Corriveau . |
| 4,926,921 | 5/1990 | Heinemann et al. . |
| 5,036,753 | 8/1991 | Ostrand et al. . |
| 5,063,833 | 11/1991 | Hara et al. ........................... 454/155 X |
| 5,080,002 | 1/1992 | Soethout et al. . |
| 5,230,654 | 7/1993 | Bloomer . |
| 5,364,303 | 11/1994 | Terry .................................... 454/315 X |

Primary Examiner—Harold Joyce
Attorney, Agent, or Firm—Weiner, Carrier & Burt; Joseph P. Carrier; Irving M. Weiner

[57] ABSTRACT

A louver assembly for directing airflow from an air duct. The assembly includes a discharge outlet adapted to attach to an air duct at an opening thereof; a plurality of directional louvers pivotably attached to the discharge outlet; and a lever, connected to the louvers, for selectively directing airflow from the air duct in a plurality of directions. The lever is pivotably connected to at least one of the louvers for concurrently movably adjusting an orientation of the louvers.

19 Claims, 2 Drawing Sheets

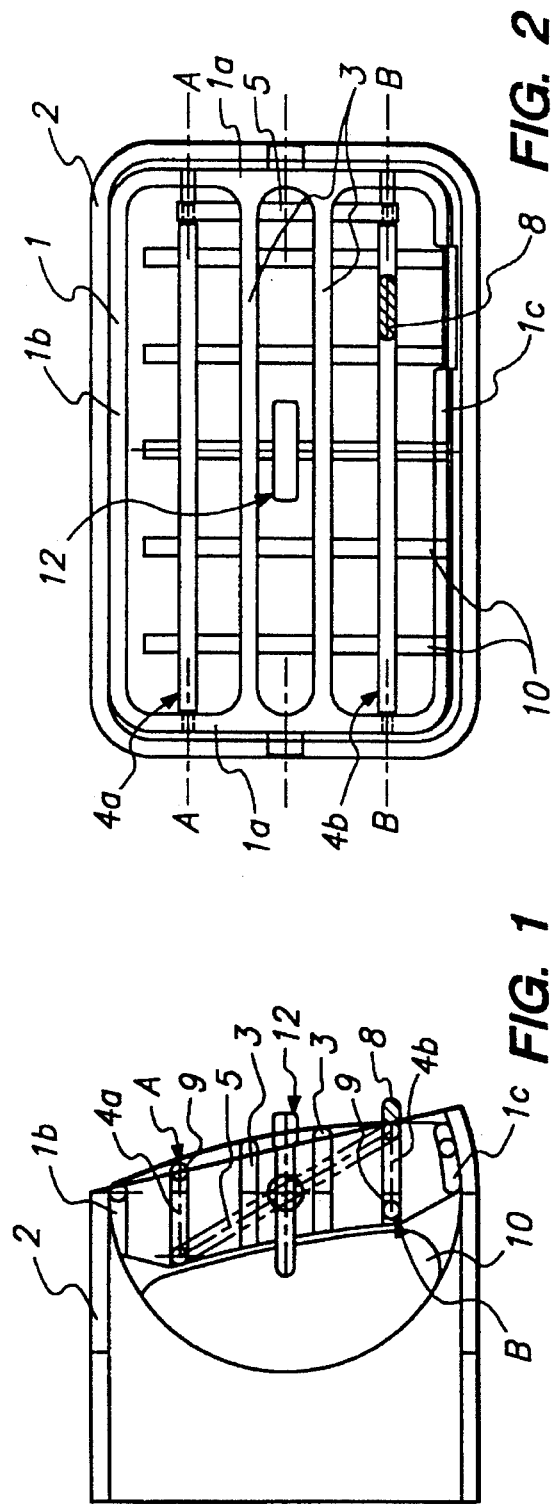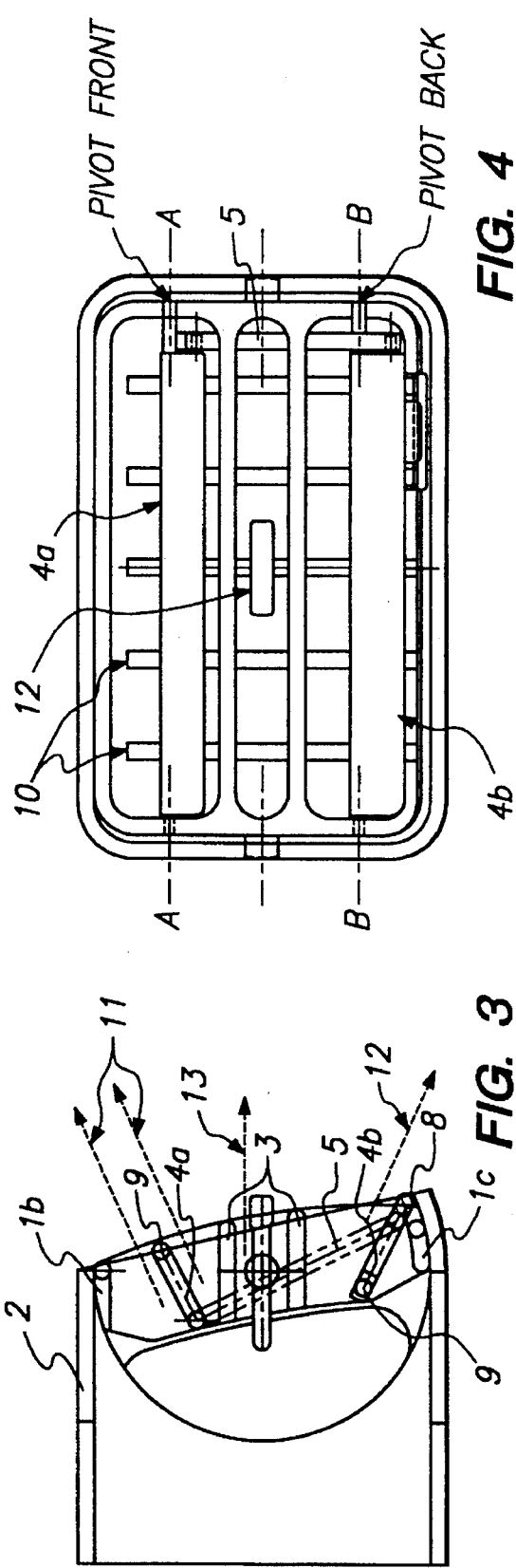

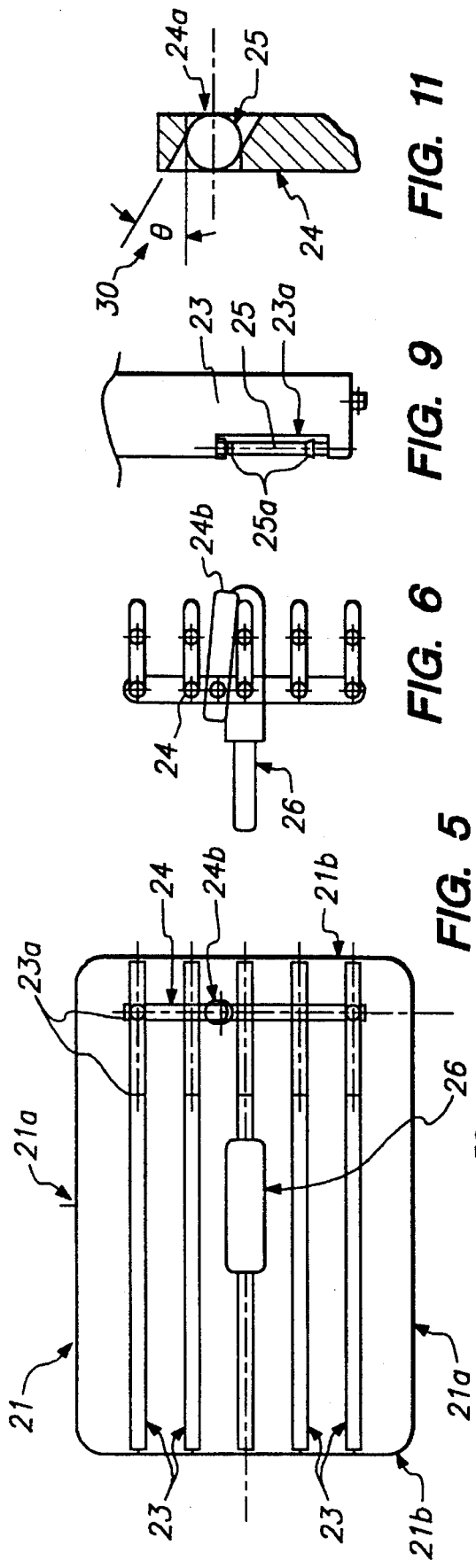
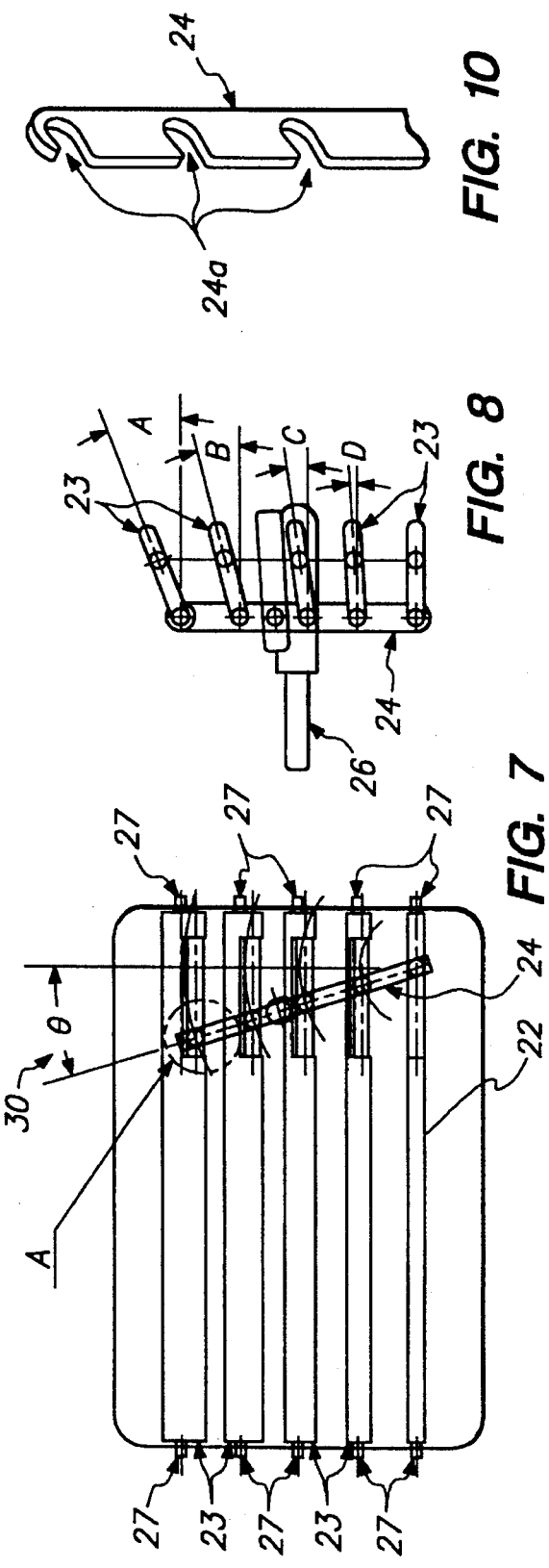

5,520,579

VENTILATION LOUVER ASSEMBLY, AND METHODS OF CONSTRUCTING AND UTILIZING SAME

BACKGROUND OF THE INVENTION

1. Field of Invention

This invention relates to a ventilation louver assembly, and particularly to a louver assembly for selectively directing airflow from an air duct in a plurality of directions so as to vary a width of dispersion of the airflow.

2. Description of the Relevant Art

There are known louver assemblies for distributing airflow. For example, U.S. Pat. No. 5,080,002 discloses an outlet nozzle having a crankcase which directs airflow in a variety of directions. This invention, however, fails to provide a louver assembly which cooperates with conventional unidirectional louver controls to provide selective guidance of airflow in a plurality of directions simultaneously.

U.S. Pat. No. 4,653,384 discloses a louver assembly in which one louver is pivotable relative to a second louver, but fails to disclose a louver assembly in which a plurality of louvers are uniquely adjustably pivotable relative to each other.

U.S. Pat. No. 5,036,753 discloses an air outlet having a spring to inwardly pivot a plurality of louvers at common angles relative to stationary louvers, but fails to disclose a louver assembly having means for pivoting a plurality of louvers at unique angles relative to a stationary louver.

U.S. Pat. No. 5,230,654 discloses an air vent having independently interlocking louvers that pivots between two positions, but fails to provide a louver assembly including means for adjustably varying a range of dispersion of air flow.

U.S. Pat. No. 3,898,921 discloses an air nozzle for unidirectional louver control and airflow quantity control, but fails to disclose a louver assembly having means for very simply directing airflow in a plurality of directions.

U.S. Pat. No. 3,952,639 discloses a louver assembly having a closure member for blocking airflow through an air duct, but fails to provide a louver assembly having selectively simultaneously multidirectional airflow.

U.S. Pat. No. 4,633,770 discloses an airflow discharge assembly having a grille which is selectively pivotable within the discharge opening, but this invention fails to disclose a louver assembly providing selectively simultaneously multidirectional airflow.

U.S. Pat. No. 3,777,650 discloses an air distributor having an air deflector mounted on a rotor, but fails to disclose a louver assembly providing selectively simultaneously multidirectional airflow control.

U.S. Pat. No. 3,921,507 discloses an orientable grill system, but fails to provide a louver assembly having means for selectively varying the distribution width of airflow from an air duct.

U.S. Pat. No. 4,665,806 discloses an air distributor for an air duct to direct air flow, but it fails to disclose an assembly having a plurality of louvers pivotably connected to an air duct, and having means connected thereto for movably adjusting a pivotal orientation of the louvers so as to vary the range of airflow from an air duct.

U.S. Pat. No. 4,926,921 discloses a louver system, but fails to disclose a louver assembly having means for selectively directing airflow in a plurality of directions simultaneously using a plurality of louvers rotatably attached to an air duct.

U.S. Pat. No. 4,729,292 discloses an air vent having a removable grill and separate perforated dampers, but it fails to disclose a louver assembly having louvers which are pivotable relative to an air duct opening and means, connected to the louvers, for selectively varying the rotational orientation thereof so as to control a width of airflow dispersion from the air duct.

U.S. Pat. No. 3,908,528 discloses an air diffuser having interconnected frames, but it fails to provide a louver assembly having movable means, connected to a plurality of louvers, for simultaneously varying the direction and width of air dispersion.

SUMMARY OF THE INVENTION

The present invention overcomes the above-discussed limitations and shortcomings of known louver assemblies and thereby satisfies a significant need for such an assembly which is simple in construction and capable of quick and easy adjustment thereof when used in conjunction with an air ventilation, heating, or air conditioning system, such as a system in a motor vehicle.

According to the present invention, there is provided a louver assembly comprising a discharge outlet which attaches to an air duct at an opening thereof; a plurality of louvers pivotably attached to the discharge outlet; and a lever member, connected to the louvers for concurrently or simultaneously directing airflow from the air duct in a plurality of directions by movably varying respective rotational orientations of the louvers relative to the air duct opening.

In a first preferred embodiment, at least two louvers are pivotably connected to the lever member and to the discharge outlet. One such louver is pivotably connected to the discharge outlet at an outwardly facing portion of the louver relative to the air duct opening, and is pivotably connected to the lever member at an inwardly facing portion of the louver. The second louver is pivotably connected to the lever member at an outwardly facing portion of the louver relative to the air duct opening, and is pivotably connected to the discharge outlet at an inwardly facing portion of the louver. Through such structure the two louvers are simultaneously pivotable because they are interconnected by the lever member, and selective movement of either louver causes both louvers to simultaneously pivot in different directions relative to the discharge outlet, thereby directing a stream of air exiting the air duct to be dispersed in a plurality of directions from the air duct opening.

In a second embodiment, each of a plurality of louvers is pivotably connected along a longitudinal axis to the discharge outlet, and is slidably engaged with the lever member at a distance from the longitudinal axis. The louvers include a recess defined in a portion thereof having a guide channel post disposed therein for slidably receiving the lever member. The lever member includes a slot defined along a side thereof for each louver in order to engage therewith. Another louver which is disposed near an end of the discharge outlet is pivotally attached to the lever member. In use, when the lever member is pivoted relative to the end louver, it simultaneously slides relative to each of the other louvers, thereby causing the other louvers to rotate relative to the discharge outlet and to the end louver at different angles thereto. Thus a simple pivoting/sliding movement of the lever member simultaneously provides multidirectional airflow from the air duct over a relatively wide dispersion range.

It is an object of the invention to provide a louver assembly having means for varying the width of dispersion of airflow simply, economically, and efficiently.

It is another object of the invention to provide a louver assembly device having means for directing airflow in a plurality of directions simultaneously which is adapted to cooperate with existing louver assemblies.

Still another object of the invention is to provide a louver assembly selectively providing unidirectional or multidirectional airflow from an air duct.

Other objects, advantages and salient features of the present invention will become apparent from the following detailed description, which, when taken in conjunction with the annexed drawings, discloses preferred embodiments of the present invention.

BRIEF DESCRIPTION OF THE DRAWINGS

FIG. 1 is a side elevational view of a louver assembly according to a first preferred embodiment of the present invention showing the louvers in a position for unidirectional airflow.

FIG. 2 is a front elevational view thereof.

FIG. 3 is a side elevational view of the first embodiment showing the louvers in a position for multidirectional airflow.

FIG. 4 is a front elevational view thereof.

FIG. 5 is a front elevational view of a louver assembly according to a second preferred embodiment of the present invention showing the louvers in a position for unidirectional airflow.

FIG. 6 is a side elevational view of thereof.

FIG. 7 is a front elevational view of the second embodiment showing the louvers in a position for multidirectional airflow.

FIG. 8 is a side elevational view thereof.

FIG. 9 is a top plan view thereof showing a single louver end portion according to the second embodiment.

FIG. 10 is a perspective view of a lever member of the second embodiment.

FIG. 11 is an enlarged sectional view of an upper end of the lever member of FIG. 10.

DETAILED DESCRIPTION OF THE PREFERRED EMBODIMENT

Referring to FIGS. 1–4, there is shown a louver assembly according to a first preferred embodiment of the present invention, including discharge outlet 1; stationary louvers 3; pivotable louvers 4a and 4b; lever 5; tab 8; and lateral louvers 10.

Discharge outlet 1 is preferably formed so as to attach to air duct 2 at an opening thereof, as shown in FIGS. 1–4. For an air duct having a rectangular opening as depicted, discharge outlet 1 includes longitudinal sides 1b and 1c, and lateral sides 1a. Discharge outlet 1 is preferably but not necessarily pivotably attached to air duct 2 in order to selectively orient the direction of airflow from the air duct. Discharge outlet 1 preferably but not necessarily includes stationary louvers 3 which are disposed longitudinally across a central portion of air duct 2 and adapted to provide a direction of airflow.

At least two louvers 4a and 4b are disposed longitudinally across the opening of air duct 2 in a spaced relation to stationary louvers 3, and are pivotably attached to discharge outlet 1 so that each are rotatable about a longitudinal axis thereof through pivot rods 9 projecting from opposite sides thereof and connected to the lateral sides 1a of the discharge outlet. Louvers 3 are preferably but not necessarily positioned between louvers 4a and 4b. As shown in FIGS. 1 and 3, louver 4a pivotably attaches through rods 9 along an outer portion thereof, relative to the opening of air duct 2, to discharge outlet 1, which is designated pivot axis A; whereas louver 4b pivotably attaches through rods 9 along an inner portion thereof, relative to the opening of air duct 2, to discharge outlet 1, which is designated pivot axis B.

The present invention additionally includes at least one conventional louver 10 disposed inwardly of the air duct 2 and substantially perpendicularly to louvers 3, 4a and 4b, and having operative controls 12 (FIG. 2) therefor for cooperating therewith in orienting airflow directed by louvers 3, 4a, and 4b.

According to the first preferred embodiment, the louver assembly includes a means for selectively providing simultaneously multidirectional airflow. Specifically, such means includes lever member 5 having a first end which is pivotably connected to an inner portion of louver 4a on the opposite side of the louver from pivot axis A, and a second end which is pivotably connected to an outer portion of louver 4b, relative to the opening of air duct 2 on the opposite side of the louver from pivot axis B. In this way, rotational movement of louver 4b about pivot axis B moves lever 5, which thereby causes louver 4a to rotate about axis A in an opposite direction from the rotational movement of louver 4b.

Lever 5 is preferably but not necessarily pivotably attached to an inner end of louver 4a and an outer end of louver 4b, relative to the opening of air duct 2. Alternatively, lever 5 is pivotably attached along a laterally central portion of either louvers 4a or 4b, so that the louver having the centrally located pivotable connection to lever 5 rotates over a larger range of angles than the rotation of the louver having a pivotable connection at an end portion thereof to lever 5.

Optionally, one of the louvers 4a, 4b may be provided with a tab 8 for making it easier for a user to grip and pivot the louvers. Tab 8 preferably but not necessarily extends outwardly from and is integrally formed with a pivotable louver, such as louver 4b, for facilitating selective movement of lever 5 and pivotable louvers 4a and 4b. Alternatively, such action may be instead facilitated by moving the pivotable louver having a pivotable connection along its outer portion thereof with lever 5, i.e., louver 4b as shown in FIGS. 1–4.

In use, the louver assembly is positioned for directing airflow in a single direction by moving tab member 8 so that louver 4b is rotated about pivot axis B until it is substantially parallel to stationary louvers 3. Such movement by louver 4b causes lever 5 to simultaneously rotate louver 4a about pivot axis A and into a similar parallel alignment with louvers 3 (FIGS. 1 and 2). Conventional airflow controls for discharge outlet 1 and perpendicular louvers 10 cooperate with louvers 3, 4a and 4b to provide selective orientation of the unidirectional airflow.

When it is desired to direct airflow in a plurality of directions simultaneously, tab 8 is moved towards an edge of discharge outlet 1, the bottom edge corresponding to longitudinal side 1c in FIGS. 1–4, which simultaneously causes louvers 4a and 4b to rotate about pivot axes A and B, respectively, in opposite directions from each other, as shown in FIGS. 3 and 4, so that each louver 4a, 4b is then disposed at a different or unique angle relative to the discharge outlet. In this position, airflow is directed by louver 4a in a direction denoted by arrow 11, louver 4b simultaneously directs air in a direction denoted by arrow 12, and louvers 3 simultaneously direct air in a third direction denoted by arrow 13, thereby simultaneously directing airflow in a plurality of directions and hence over a wide range of dispersion. Conventional control of discharge outlet 1 and perpendicular louvers 10 cooperate with louvers 3, 4a, and 4b so as to orient the simultaneously multidirectional airflow which is controlled thereby.

Referring to FIGS. 5–11, there is shown a louver assembly according to a second embodiment of the present invention. The louver assembly comprises discharge outlet 21, pivotable louvers 22 and 23, and lever member 24. Discharge outlet 21 preferably attaches within an opening in an air duct and is shaped so as to substantially form thereto. If the air duct opening is shaped as a rectangle, discharge outlet 21 preferably comprises longitudinal sides 21a and lateral sides 21b, as shown in FIG. 5. Optionally, discharge outlet 21 is pivotably attached to an air duct opening so as to adjustably orient the directed airflow.

The second preferred embodiment preferably but not necessarily includes a plurality of louvers 23 and one louver 22 which are disposed longitudinally along discharge outlet 21 in a spaced relation from each other. Louvers 22 and 23 are each pivotably attached along a horizontal axis to discharge outlet 21 through pivot rods 27 (FIG. 7). Louver 22 is preferably disposed proximally to an edge of discharge outlet 21. Although a plurality of louvers 23 are depicted and preferably used, this embodiment of the invention could function with one or more of the louvers 23.

The second preferred embodiment includes means for selectively directing airflow in a plurality of directions simultaneously by varying a degree of rotation of louvers 23 relative to each other. Such means includes lever member 24, which is pivotably attached to louver 22 and slidably engages with each louver 23. Lever 24 preferably but not necessarily includes an extension member 24b (FIG. 5) which extends outwardly from discharge outlet 21 such that it may be easily gripped by a person to provide operative control of lever 24.

Lever 24 preferably but not necessarily engages with each louver 23 along a longitudinal side thereof which is substantially at a distance from the rotational axis formed by the pivotable connection to discharge outlet 21, as shown in FIGS. 6 and 8. By way of example and as depicted, louvers 23 are pivotably connected at an outer portion thereof to discharge outlet 21, and slidably engage along an inner edge thereof with lever 24, relative to the air duct opening. Alternatively, louvers 23 may be pivotably connected at an inner portion thereof to discharge outlet 21, and slidably engage along an outer edge thereof with lever 24, relative to the air duct opening. In either case, movement of lever 24 (pivoting movement relative to louver 22 and sliding movement relative to louvers 23) causes each louver 23 to rotate about its rotational longitudinal axis.

The sliding engagement of lever 24 with each louver 23 is preferably achieved by a plurality of slots 24a disposed along a longitudinal side of lever 24, with each slot 24a corresponding to a louver 23 (FIG. 10). Additionally, each louver 23 includes a recess 23a defined in a portion of a longitudinal side thereof, having a guide post 25 disposed therein for receiving a corresponding slot 24a (FIG. 9). The guide posts 25 are preferably disposed in line with a longitudinal edge of louvers 23, as depicted. The width of slot 24a is sized so as to allow lever 24 to slide substantially along each guide post 25 while maintaining its pivotable connection with louver 22, and the slot surfaces are angled or bevelled as shown in FIG. 11 for facilitating the sliding engagement with the guide posts 25. As depicted, the angle 30 at which the slot surfaces are bevelled is preferably the same as the maximum angle through which the lever 24 may be pivoted relative to louver 22 (FIG. 7). The longitudinal width of recess 23a depends on the amount of rotation of louvers 23 desired relative to louver 22, and on the distance between a particular louver 23 and louver 22.

In use, louvers 22 and 23 are positioned for directing airflow in one direction by sliding lever 24 in a position substantially perpendicular to the planes formed by louvers 22 and 23. Such sliding of lever 24 rotates each louver 23 until it is substantially parallel to louver 22, thereby directing unidirectional airflow. Conventional airflow controls for movement of discharge outlet 1, other associated louvers, and for control of louvers 22 and 23 as a single entity cooperate with louvers 22 and 23 to provide selective orientation of the airflow. One such control member 26 is shown in FIGS. 5 and 6.

If it is desired to direct airflow from the air duct opening in a plurality of directions, lever 24 is rotated about louver 22 from its substantially perpendicular, unidirectional airflow position such that the surfaces of slots 24a slide along each guide post 25 of louvers 23. Such rotation causes each louver 23 to rotate about its rotational axis defined by its pivotable connection to discharge outlet 21. The amount of rotation of each louver 23 depends in part upon the distance between it and louver 22.

For example, the louver 23 which is positioned farthest away from louver 22 rotates the most about it rotational axis, while the louver 23 nearest louver 22 rotates the least (FIGS. 7 and 8). As a result of these differences in the amount of rotation of each louver 23 relative to each other, airflow guided by each louver 23 is in a different direction from the direction of airflow guided by the other louvers 23 and louver 22, thereby simultaneously directing air in a plurality of directions. When the lever 24 is pivoted from its unidirectional, perpendicular orientation, each of the louvers 23 and the louver 22 will be disposed at a unique angle relative to the discharge outlet 1, similarly to the louvers 4a, 4b in the first embodiment above.

The amount of rotation of each of louvers 23 depends on the angle through which lever 24 is pivoted relative to louver 22, i.e., the greater the angle through which lever 24 is pivoted, the greater the angles through which louvers 23 are pivoted. In this regard, guide post 25 of at least one louver 23 preferably includes a series of grooves or notches 25a disposed therealong into which a corresponding slot 24 may be securely fitted for positioning lever 24 in a plurality of predetermined locations along guide post 25. As shown in FIG. 9, the guide post 25 of one louver 23 has two notches 25a near opposite ends thereof corresponding to extreme positions of the lever 24.

The invention is preferably but not necessarily substantially constructed of a sturdy material, such as molded plastic, but optionally the invention is constructed from other materials. The exposed surfaces of the invention preferably are resistant to direct sunlight.

Although there have been described what are at present considered to be the preferred embodiments of the present invention, it will be understood that the invention can be embodied in other specific forms without departing from the spirit or essential characteristics thereof.

For example, the first embodiment of the present invention may be optionally implemented by changing the locations of pivot axes A and B relative to louvers 4a and 4b, so that louver 4a is pivotally attached at an inner portion thereof and louver 4b is pivotally attached at an outer portion thereof to discharge outlet 1, respectively, and lever 5 is pivotably attached to the outer portion of louver 4a and the inner portion of louver 4b. Simultaneously multidirectional control is then facilitated through selective rotational movement of louver 4a about pivot axis A, via tab 8 extending therefrom or otherwise, which causes lever 5 to rotate louver 4b about pivot axis B in a different orientation from louvers 3 and 4a, thereby simultaneously directing airflow in a plurality of directions.

The described embodiments are, therefore, to be considered in all aspects as illustrative, and not restrictive. The scope of the invention is indicated by the appended claims rather than the foregoing description.

I claim:

1. A louver assembly for directing airflow from an air duct opening, comprising:
   a discharge outlet which attaches to an air duct at an opening thereof;
   a plurality of directional louvers pivotably attached to said discharge outlet;
   means, connected to each of said directional louvers, for selectively simultaneously directing airflow from said air duct in a plurality of directions;
   said directing means simultaneously acts on each of said directional louvers to orient each of said directional louvers at a unique angle relative to said discharge outlet; and
   said directing means including a linking member interconnecting at least two of said directional louvers such that said at least two louvers rotate in opposite directions about said linking member when said louvers are oriented by said linking means.

2. A louver assembly as recited in claim 1, including:
   said directing means being movable together with said louvers as said louvers are pivoted relative to said discharge outlet.

3. A louver assembly as recited in claim 1, wherein:
   said directing means is pivotally connected to one of said louvers disposed near an end of said discharge outlet.

4. A louver assembly as recited in claim 1, wherein said directing means consists of said linking member.

5. A louver assembly as recited in claim 1, including:
   at least one stationary louver connected to said discharge outlet; and
   said directing means simultaneously moves said directional louvers into substantially parallel alignment with said stationary louver for directing airflow in a single direction.

6. A louver assembly as recited in claim 5, wherein said stationary louver has an opening defined therethrough, and said linking member extends through said opening.

7. A louver assembly as recited in claim 1, wherein one of said directional louvers includes a grippable portion projecting outwardly of the air duct for facilitating orientation of the louvers.

8. A louver assembly as recited in claim 1, wherein each of said directional louvers is pivotably attached to said discharge outlet so as to rotate about a vertical or horizontal axis.

9. A louver assembly for directing airflow from an air duct opening, comprising:
   a discharge outlet which attaches to an air duct at an opening thereof;
   a plurality of directional louvers pivotably attached to said discharge outlet;
   means, connected to each of said directional louvers, for selectively simultaneously directing airflow from said air duct in a plurality of directions;
   said directing means simultaneously acts on each of said directional louvers to orient each of said directional louvers at a unique angle relative to said discharge outlet;
   a first of said louvers is pivotally connected near an outwardly facing portion thereof to said discharge outlet relative to said air duct opening, defining a first axis of rotation;
   said directing means is pivotally connected to said first louver at a distance from said first axis of rotation;
   a second of said louvers is pivotally connected near an inwardly facing portion thereof to said discharge outlet relative to said air duct opening, defining a second axis of rotation; and
   said directing means is pivotally connected to said second louver at a distance from said second axis of rotation.

10. A louver assembly as recited in claim 9, wherein:
    said discharge outlet includes at least one louver positioned between said first louver and said second louver.

11. A louver assembly as recited in claim 9, wherein:
    said directing means adjusts a rotational orientation of said first and said second directional louvers in different directions relative to said discharge outlet.

12. A louver assembly for attachment to an air duct opening, comprising:
    a discharge outlet which attaches to said air duct at an opening thereof;
    at least two directional louvers, each of which is pivotably connected along a longitudinal axis thereof to said discharge outlet;
    means, pivotably connected to each of said directional louvers at a distance from said longitudinal axis thereof, for selectively simultaneously moving said louvers into respective orientations so as to simultaneously direct airflow in a plurality of directions from said air duct opening;
    said moving means orients each of said directional louvers at a unique angle relative to said discharge outlet; and
    said moving means including a linking member interconnecting said directional louvers such that said louvers rotate in opposite directions about said linking member when the louvers are oriented by said moving means.

13. A louver assembly as recited in claim 12, including:
    at least one stationary louver connected to said discharge outlet; and
    said moving means selectively simultaneously moves said directional louvers into substantially parallel alignment with said stationary louver for directing airflow in a single direction.

14. A louver assembly as recited in claim 12, wherein said moving means consists of said linking member.

15. A louver assembly as recited in claim 13, wherein said stationary louver has an opening defined therethrough, and said linking member extends through the opening.

16. A louver assembly as recited in claim 12, wherein one of said directional louvers has a grippable portion projecting outwardly of said air duct for facilitating orientation of the louvers.

17. A louver assembly as recited in claim 12, wherein the longitudinal axis of each said directional louver extends vertically or horizontally.

18. A louver assembly as recited in claim 12, wherein:

said moving means selectively moves each of said directional louvers to one of a plurality of unique angles relative to said discharge outlet, and selectively moves each of said directional louvers to a common angle relative to said discharge outlet.

19. A louver assembly for attachment to an air duct opening, comprising:

a discharge outlet which attaches to said air duct at an opening thereof;

at least two directional louvers, each of which is pivotably connected along a longitudinal axis thereof to said discharge outlet;

means, pivotably connected to each of said directional louvers at a distance from said longitudinal axis thereof, for selectively simultaneously moving said louvers into respective orientations so as to simultaneously direct airflow in a plurality of directions from said air duct opening:

said moving means orients each of said directional louvers at a unique angle relative to said discharge outlet;

said moving means comprises a lever connected between said directional louvers;

one of said directional louvers is pivotably attached near an inwardly facing portion thereof to said discharge outlet, relative to said air duct opening, and is pivotably attached near an outwardly facing portion thereof to said lever; and another of said directional louvers is pivotably attached near an inwardly facing portion thereof to said lever, relative to said air duct opening, and is pivotably attached near an outwardly facing portion thereof to said discharge outlet.

* * * * *